(12) United States Patent
Gertel

(10) Patent No.: US 9,559,575 B2
(45) Date of Patent: Jan. 31, 2017

(54) ORNITHOPTER ENGINE

(71) Applicant: Oren Mordechai Gertel, Holon (IL)

(72) Inventor: Oren Mordechai Gertel, Holon (IL)

(*) Notice: Subject to any disclaimer, the term of this patent is extended or adjusted under 35 U.S.C. 154(b) by 606 days.

(21) Appl. No.: 14/045,812

(22) Filed: Oct. 4, 2013

(65) Prior Publication Data

US 2014/0285035 A1 Sep. 25, 2014

(30) Foreign Application Priority Data

Mar. 19, 2013 (IL) .......................................... 225336

(51) Int. Cl.
| | |
|---|---|
| *H02K 33/16* | (2006.01) |
| *H02K 33/02* | (2006.01) |
| *H02K 41/035* | (2006.01) |

(52) U.S. Cl.
CPC ............. *H02K 33/16* (2013.01); *H02K 33/02* (2013.01); *H02K 41/0358* (2013.01)

(58) Field of Classification Search
CPC ..... H02K 33/02; H02K 33/16; H02K 41/0358
USPC .................................................... 310/36, 38
IPC ..................................................... H02K 33/16
See application file for complete search history.

(56) References Cited

U.S. PATENT DOCUMENTS

| | | | | | |
|---|---|---|---|---|---|
| 2,038,954 | A * | 4/1936 | Pace | ...................... | H02M 1/20 310/112 |
| 3,011,062 | A * | 11/1961 | Goldsmith | .............. | F03B 13/26 290/53 |
| 4,260,901 | A * | 4/1981 | Woodbridge | ....... | F03B 13/1855 290/42 |
| 8,026,620 | B2 * | 9/2011 | Hobdy | .................... | F03B 13/20 290/42 |
| 8,299,659 | B1 * | 10/2012 | Bartol, Jr. | .............. | H02K 35/02 310/152 |
| 8,456,029 | B2 * | 6/2013 | Powers | .................... | H02K 7/06 290/1 A |
| 8,816,541 | B1 * | 8/2014 | Bristow | ................. | H02K 35/02 310/113 |
| 2014/0285035 | A1 * | 9/2014 | Gertel | .................... | H02K 33/16 310/38 |

* cited by examiner

*Primary Examiner* — John K Kim
(74) *Attorney, Agent, or Firm* — Mark David Torche; Patwrite LLC

(57) ABSTRACT

An ornithopter engine and method of generating an iterative flapping motion are disclosed. The engine includes a structural frame, having at least two swinging member mounting portions, a driving magnetic member shaft mounting portion and a driving magnetic members shaft. The driving magnetic members shaft is rotatable relatively to the structural frame. The engine includes at least two driving magnetic members, affixed to the driving magnetic member shaft and at least two swinging members, pivotally mounted onto the structural frame. The engine further includes at least one driven magnetic member, affixed to the swinging member and a motor coupled to the shaft.

20 Claims, 10 Drawing Sheets

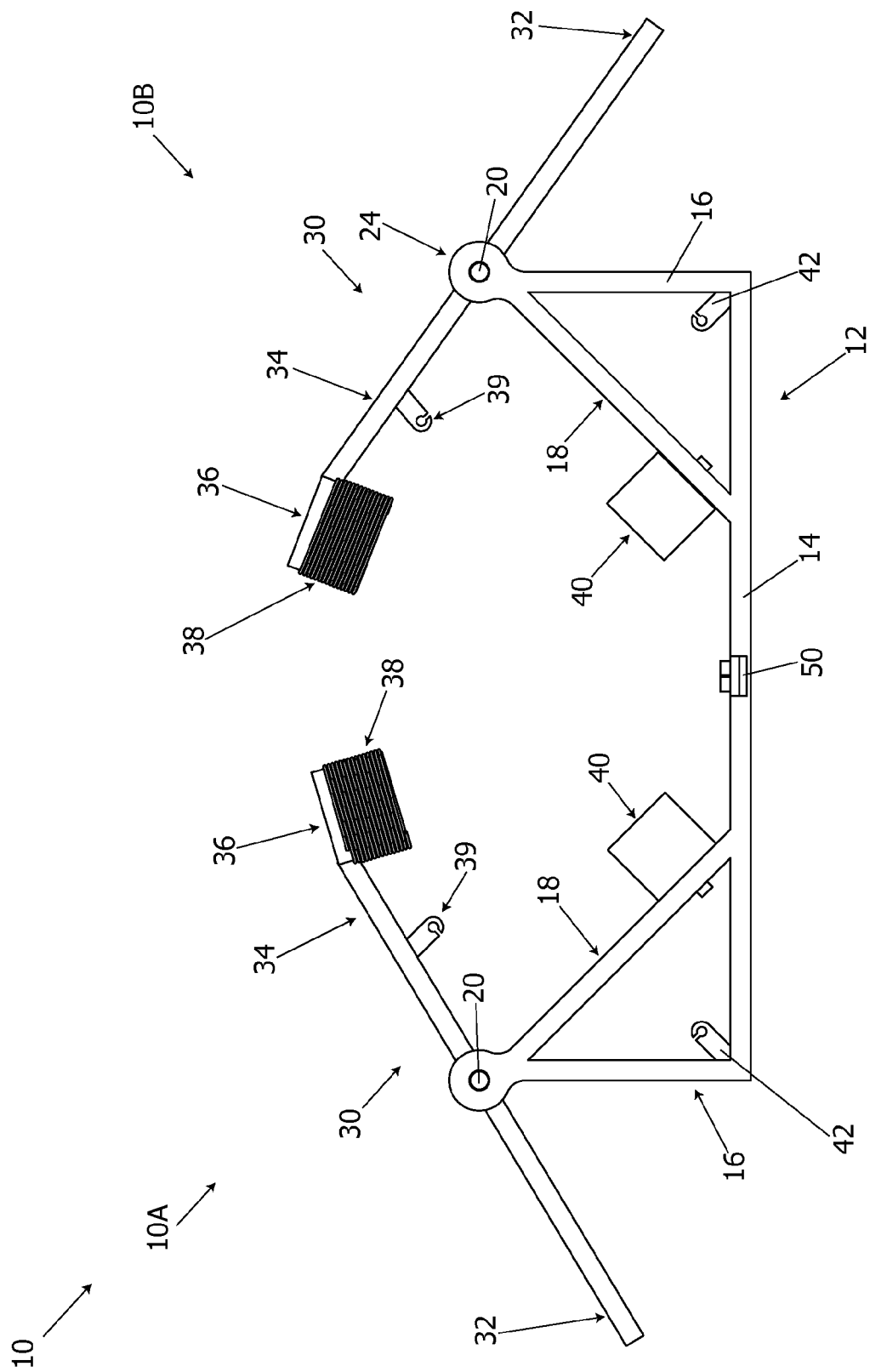

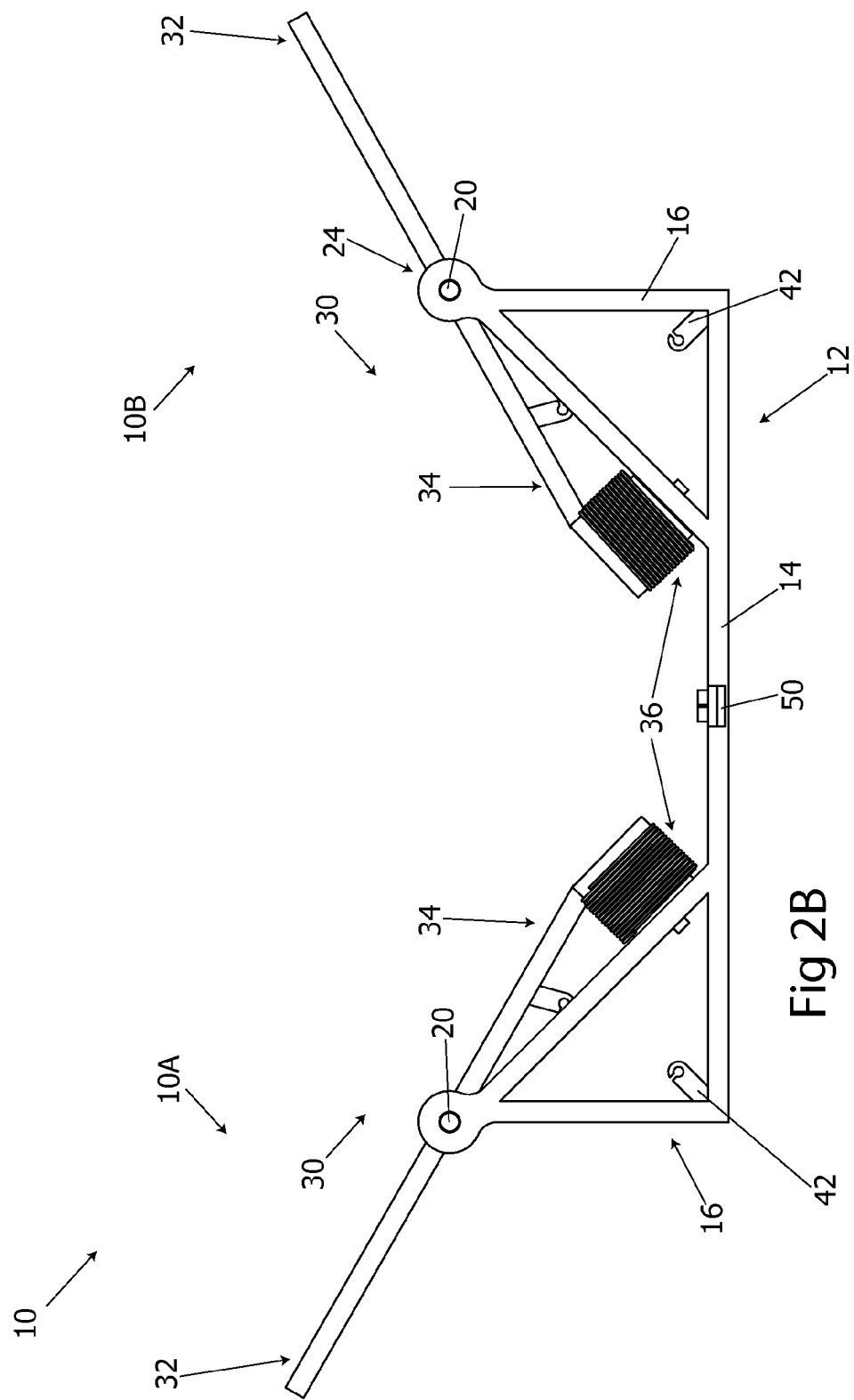

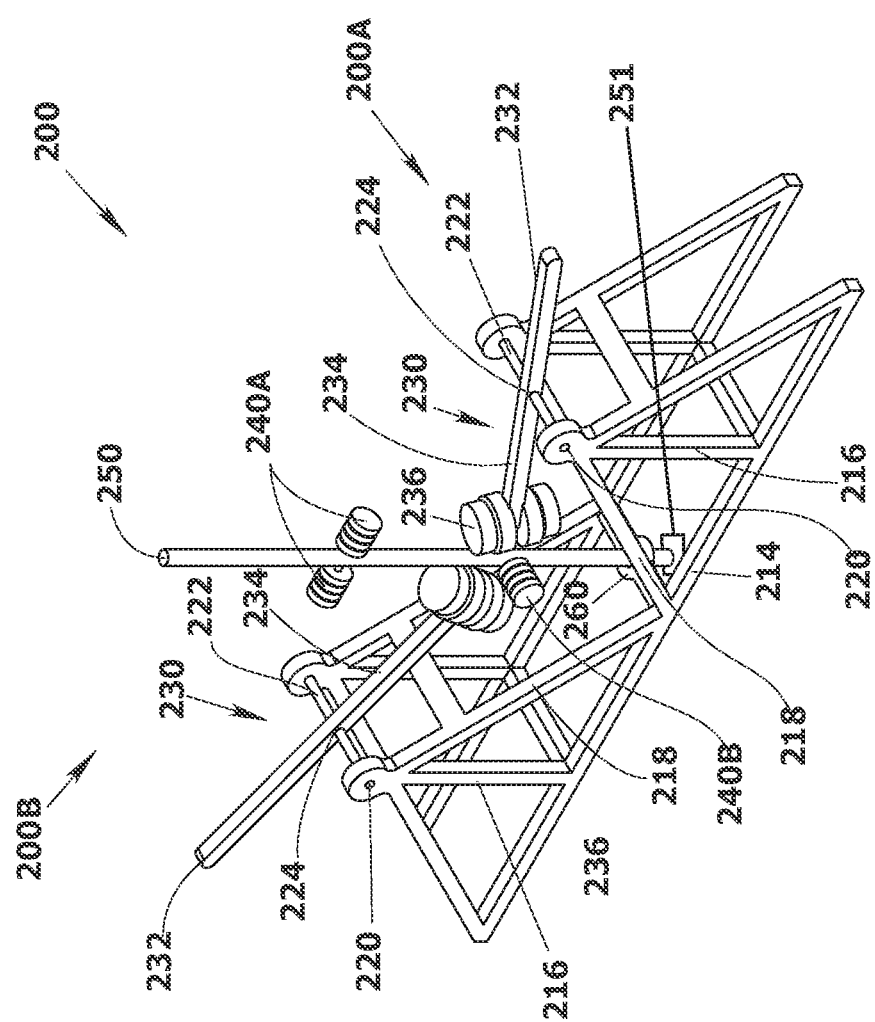

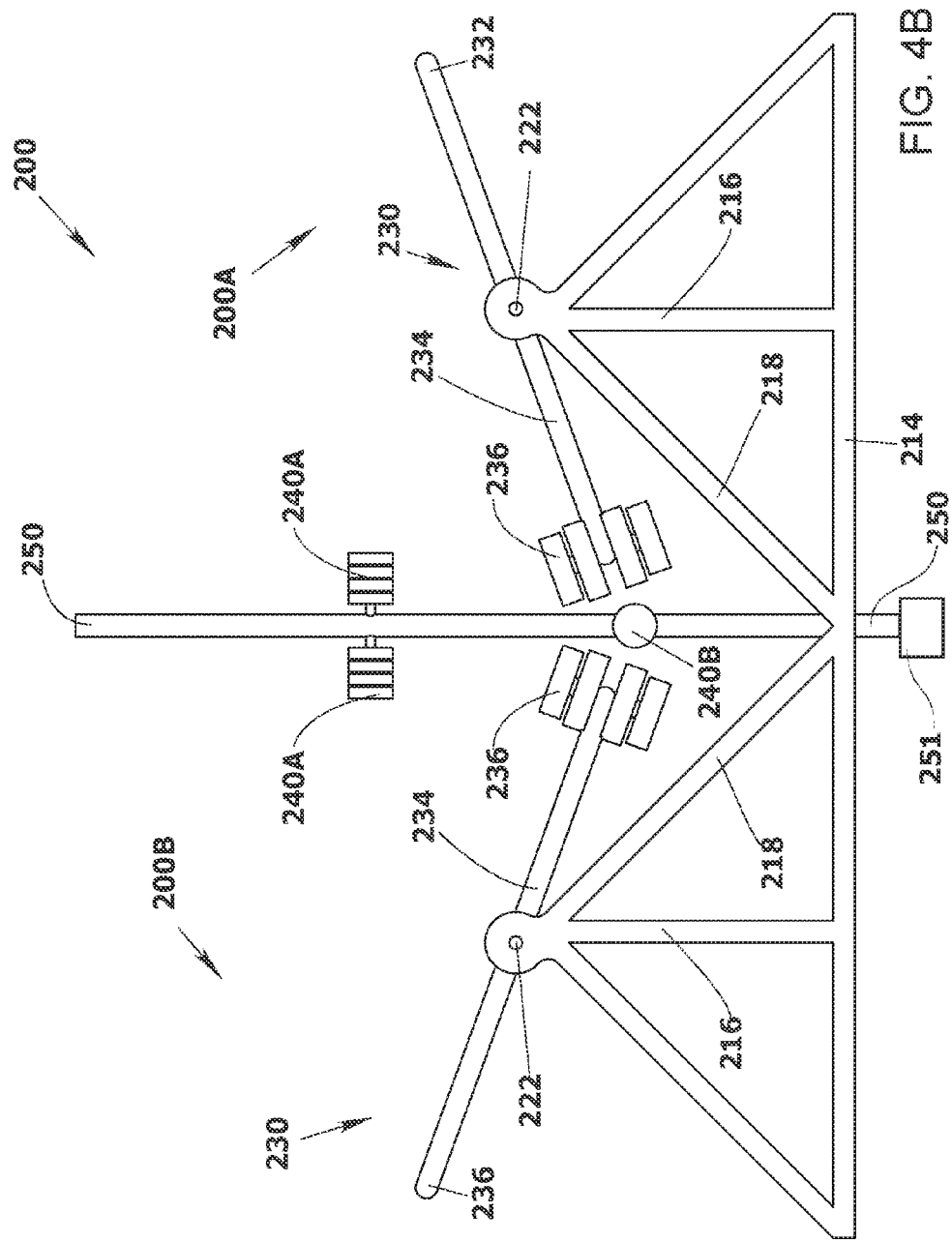

ORNITHOPTER ENGINE

TECHNICAL FIELD

In general, the present invention pertains to appliances adapted to produce an iterative flapping motion. In particular, the invention relates to appliances adapted to produce an iterative flapping motion, employing magnetic elements.

BACKGROUND ART

It is believed that the pertinent state-of-the-art is represented by: U.S. patents Ser. No. U.S. Pat. No. 7,204,455, U.S. Pat. No. 6,802,473 and U.S. Pat. No. 6,082,671; GB patent Ser. No. GB851352; German patent or patent application Ser. No. DE932346 and DE19509774; Korean patent/application Ser. No. KR20040035659; Chinese patent/utility model Ser. No. CN1453185 and CN201415756Y as well as by international patent applications having Publication No. WO2011073659.

CN1453185 discloses a bionic electromagnetically driven flapping wing unit for a mini aircraft, consisting of planar wings, electromagnetic driver, control system and fuselage. Film is adhered onto planar netted skeleton to form the wing, and each planar netted skeleton has three relatively thick shafts with three parallel driving shafts perpendicular to the longitudinal central line of the aircraft.

In CN1453185 each planar wing has one vibration eliminating block adhered to the front edge, and corresponding to each driving shaft, there are two independent parallel electromagnetic drivers. The coil axle, the coil, the spring and the permanent magnet have their axes coincide each other and perpendicular to wing surface and driving shaft. Each unit has at least one pair of planar wings and electromagnetic drivers set symmetrically on the fuselage.

DESCRIPTION OF THE DRAWINGS

The present invention will be understood and appreciated more comprehensively from the following detailed description taken in conjunction with the appended drawings in which:

FIG. 1B is a schematic side view of an embodiment of the ornithopter engine of the invention, in an activated conformation;

FIG. 2B is a schematic side view of an embodiment of the ornithopter engine of the invention, in a deactivated conformation;

FIG. 4A is an isometric view of a preferred embodiment of the ornithopter engine of the invention, in a deactivated conformation;

FIG. 4B is a side view of a preferred embodiment of the ornithopter engine of the invention, in a deactivated conformation;

Figure 1A:
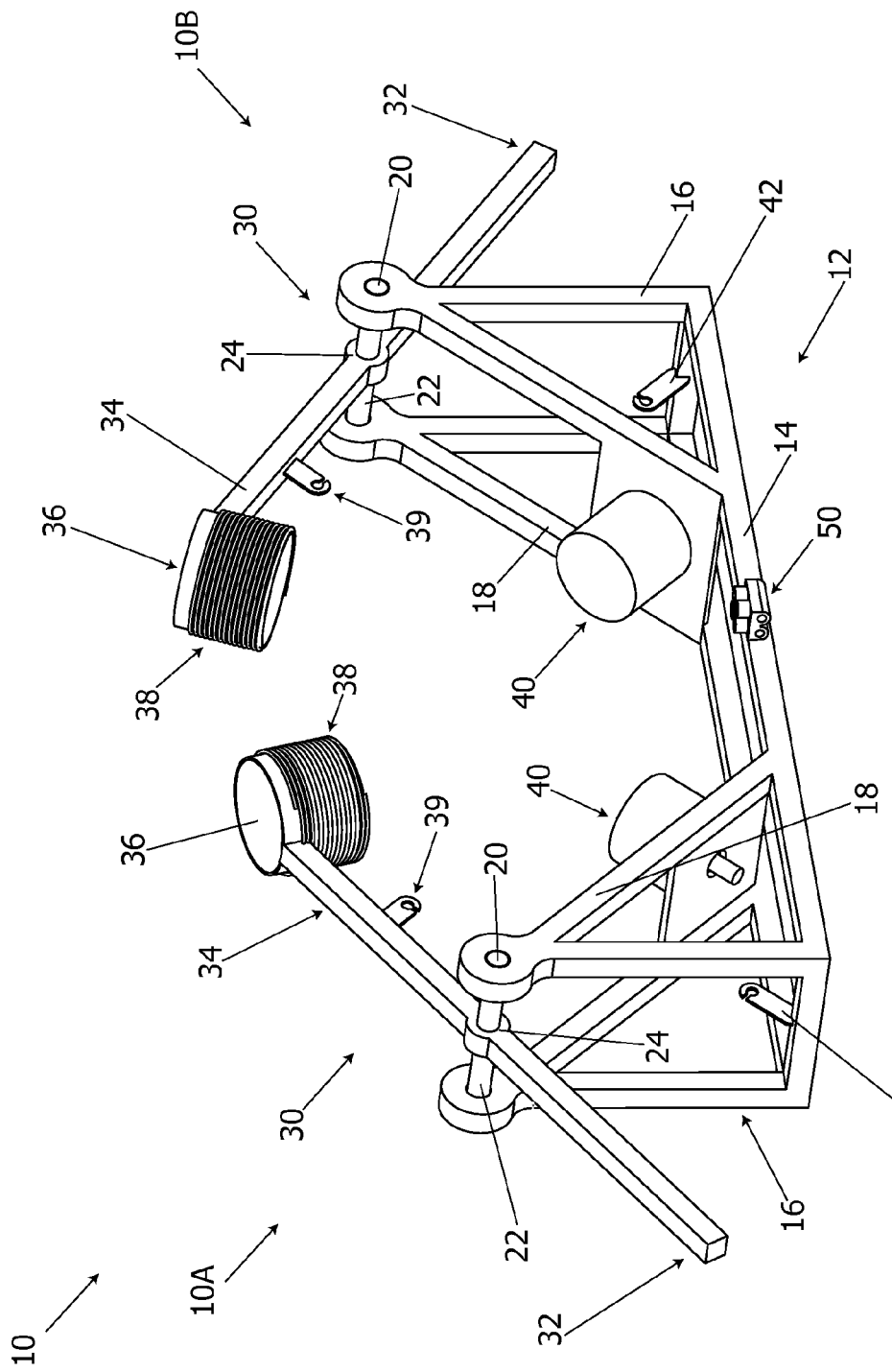
FIG. 1A is a schematic isometric view of an embodiment of the ornithopter engine of the invention, in an activated conformation.
Figure 2A:
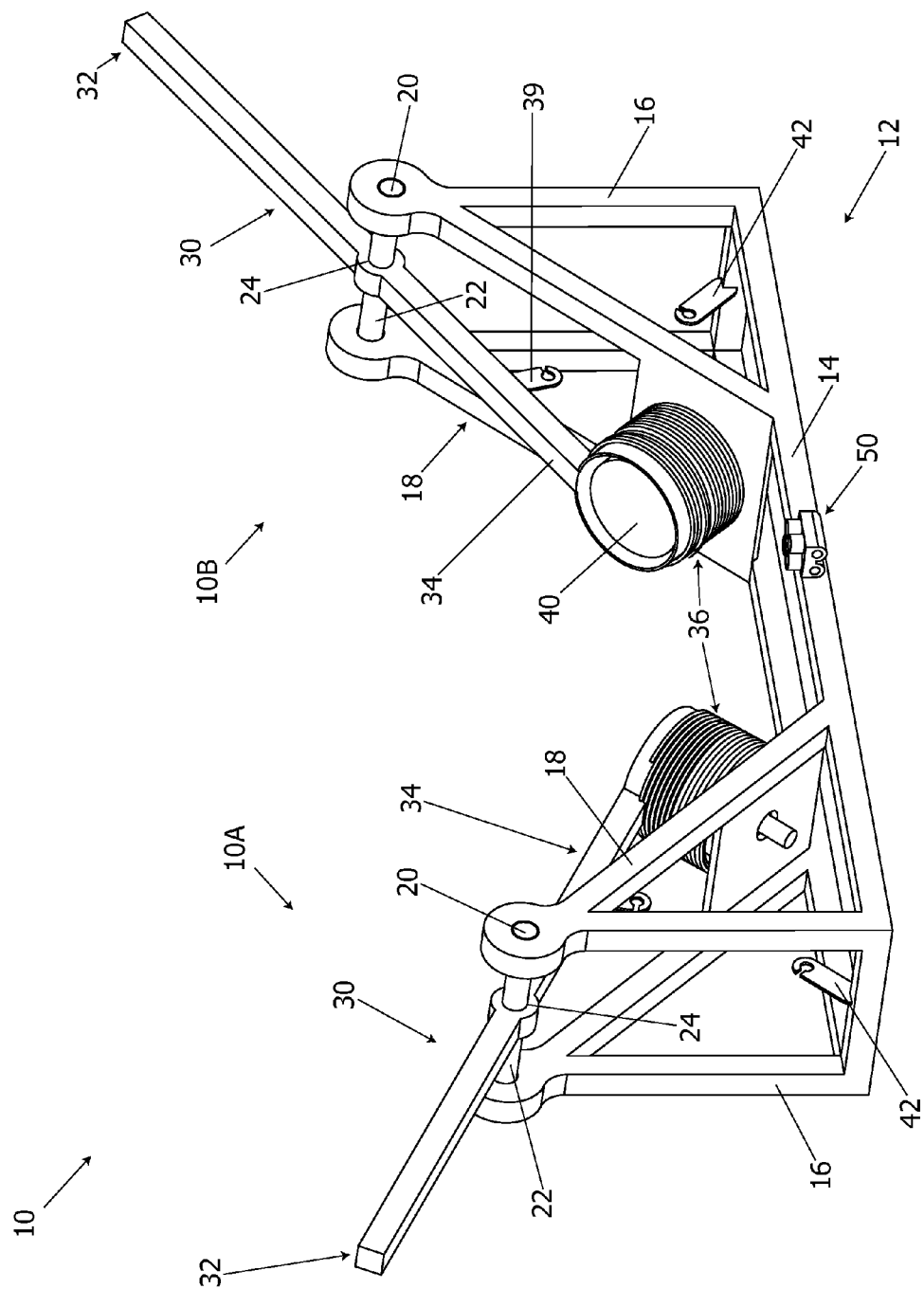
FIG. 2A is a schematic isometric view of an embodiment of the ornithopter engine of the invention, in a deactivated conformation.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DEFINITIONS

The term ornithopter and/or ornithopter engine, as referred to herein, should be understood as an appliance adapted to produce an iterative flapping motion. The term ornithopter and/or ornithopter engine, as referred to herein, should not be construed as entailing an implementation in aviation field or aeronautic arts but rather as an as appliance adapted to produce an iterative flapping motion. Among various implementations of the ornithopter engine of the present invention, aviation is merely a singular exemplary field of implementation; whereas numerous other implementations in various different fields, non-related to aviation, such as fans and blowers, are existent and contemplated in the scope of the present invention. Therefore the use of the term ornithopter and/or ornithopter engine is intended to describe the functional output of such ornithopter or ornithopter engine—without signifying the implementation of such ornithopter or ornithopter engine in particular field of the art.

DETAILED DESCRIPTION OF EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

In accordance with some embodiments of the present invention, reference is now made to FIG. 1A to 2B, showing ornithopter engine 10 in an activated conformation. Ornithopter engine 10 comprises moieties 10A and 10B. Moieties 10A and 10B of ornithopter engine 10 are operable independently one of the other, respectively dedicated for operating each the two wings of the ornithopter (not shown), irrespectively and/or independently of each other. Moieties 10A and 10B include structural frame 12, swinging members 30 and driving magnetic members 40. Structural frame 12 further comprises base portion 14, swinging member mounting portions 16 and driving magnetic member mounting portions 18.

Swinging member mounting portions 16 extend upwardly from base portion 14 of structural frame 12. Swinging member mounting portions 16 are furnished with bearings 20. Bearings 20 are any type of suitable bearings known in the art, inter alia including ball bearings, cylindrical rollers bearings, tapered rollers bearings, spherical rollers bearings, needles bearings, plain or frictional bearings, fluid bearings, magnetic bearings and flexure bearings. Shafts 22 are mounted within bearings 20, providing for a smooth rotational movement of shafts 22 relatively to swinging member mounting portions 16 of structural frame 12. Swinging members 30 are affixed on shafts 22 and thereby rotatable on shafts 22 relatively to swinging member mounting portions 16 of structural frame 12.

Alternatively or additionally to bearings 20, at the top of swinging member mounting portions 16 of structural frame 12, swinging members 30 are furnished with bearings 24. Shafts 22 are affixed in bearings 24; thereby facilitating a smooth rotational movement of swinging members 30 relatively to shafts 22.

Driving magnetic member mounting portions 18 extend from base portion 14 of structural frame 12 at a predetermined angle. Driving magnetic member mounting portions 18 support driving magnetic members 40. The angle at which driving magnetic member mounting portions 18 extend from base portion 14 of structural frame 12 positions driving magnetic members 40 to coincide with a sector of the toroidal trajectory of the swinging members 30, while rotated about shaft 22.

Swinging members 30 comprise wing associated portions 32. Wing associated portions 32 of swinging members 30 optionally embody at least one structural element (not shown) for affixing/mounting a wing assembly (not shown) thereto/thereon. Alternatively or additionally wing associated portions 32 of swinging members 30 embody an integral part of the wing assembly (not shown). Optionally wing associated portions 32 of swinging members 30 further comprise joints or pivotally connected extensions, forming a wave-like flapping motion of the of the peripheral portion/s of the wing assembly (not shown).

Swinging members 30 comprise magnetic members associated portions 34. Magnetic members associated portions 34 terminate with driven magnetic members 36. Driven magnetic members 36 form a toroidal trajectory while swinging members 30 are rotated about shaft 22. A sector of the toroidal trajectory formed by driven magnetic members 36 upon rotation of swinging members 30 about shaft 22 coincides with driving magnetic members 40.

Optionally, structural frame 12 of ornithopter engine 10 includes tabs 42 and swinging members 30 include respective tabs 39. A biasing means (not shown) is drawn between tabs 42 of structural frame 12 and respective tabs 39 of swinging members 30. The biasing means is a spring, stretchable band or any other elastic element capable of contracting upon being stretched; thereby driving swinging members 30 of ornithopter engine 10 into the deactivated conformation, shown in FIGS. 2A and 2B. A compressible biasing means that accumulates energy by construction upon rotation of swinging members 30 is equally applicable.

Driven magnetic member 36 and/or driving magnetic member 40 as well as any magnetic member referred to herein for that matter is equally at least one of: a metallic magnet, ferromagnetic element, solenoid or any type of wound coil and nonmetallic magnet made from an organic polymer, such as PANiCNQ, which is a combination of emeraldine-based polyaniline (PANi) and tetracyanoquinodimethane (TCNQ).

The magnetic members typically embody a pair of cylinder, such as driving magnetic members 40, and a compatible cylinder shell, such as driven magnetic members 36, wherein the tolerance of the interstices in-between the respective exterior and interior faces thereof facilitates a virtually frictionless translation of the former within the latter. In some preferred embodiment the magnetic members embody the shape of a sector of a torus (not shown) and a compatible toroidal sector shell (not shown), wherein the tolerance of the interstices in-between the respective exterior and interior faces thereof is reduced to minimum; whereby a higher rotational torque of the former relatively the latter is achieved.

Magnetic members which embody a cylindrical shape or a sector-torus-shape are typically at least one of: a metallic magnet, ferromagnetic element and nonmetallic magnet made from an organic polymer. Whereas magnetic members which embody a cylindrical shell or sector-torus-shell shapes are typically at least one of: solenoid and wound coil of any kind.

It should be acknowledged that in FIGS. 1A to 2B driving magnetic members 40 are shown as embodying a cylindrical shape of a metallic magnet, ferromagnetic element or nonmetallic magnet made from an organic polymer, merely by a way of example, whereas in other examples driving magnetic members 40 cylindrical shell shape of a solenoid or wound coil and driven magnetic members 36 embodying a cylindrical shape of a metallic magnet, ferromagnetic element and nonmetallic magnet. In the latter instance driven magnetic members 36 embodying a cylindrical shape of a metallic magnet, ferromagnetic element and nonmetallic magnet, which are typically characterized by a substantially larger weight, are implementable for counterbalancing the weight of the wing assembly (not shown) mounted on wing associated portions 32 of swinging members 30.

Driven magnetic member 36 and/or driving magnetic member 40 as well as any magnetic member referred to herein for that matter are typically either static magnetic members or dynamic magnetic members. Static magnetic members, as referred to herein, comprise an element that constantly forms and/or generates a magnetic field about itself or is constantly sensitive to a magnetic field about itself, which typically include the examples of metallic/nonmetallic magnet and respectively ferromagnetic element that embody a cylindrical shape.

Dynamic magnetic members, as referred to herein, comprise an element that non-constantly or intermittently and controllably forms and/or generates a magnetic field about itself or is non-constantly or intermittently and controllably sensitive to a magnetic field about itself, which typically include the examples of a solenoid or wound coil that optionally embody a cylindrical shell shape.

Each moiety 10A or 10B of ornithopter engine 10 typically comprises at least one static magnetic member and least one dynamic magnetic member or at least two dynamic magnetic members. Each moiety 10A or 10B of ornithopter engine 10 is optionally operable in a unidirectional action modus operandi. In the unidirectional action modus operandi, from the deactivated conformation, shown in FIGS. 2A and 2B, where driving magnetic members 40 and driven magnetic members 36 are disposed the former within the latter, a magnetic field is formed for a predetermined period of time by the dynamic magnetic members, with orientation unopposed to or co-aligned with the orientation of the static magnetic members or with orientation unopposed to or co-aligned with the orientation of the second dynamic magnetic members; whereby a rotational torque force is exerted onto driven magnetic members 36 and swinging members 30 are rotated into the activated conformation, shown in FIGS. 1A and 1B, flapping the wings of the ornithopter (not shown) in downward direction. Thereafter the induction of dynamic magnetic members is halt and the magnetic field formed thereby is deactivated, whereby the biasing means drawn between tabs 42 of structural frame 12 and respective tabs 39 of swinging members 30 drive swinging members 30 towards frame 12, thus competing the flapping cycle by flapping the wings of the ornithopter (not shown) in upward direction.

Each moiety 10A or 10B of ornithopter engine 10 is optionally operable in a bidirectional action modus operandi. In the bidirectional action modus operandi, from the deactivated conformation, shown in FIGS. 2A and 2B, where driving magnetic members 40 and driven magnetic members 36 are disposed the former within the latter, a magnetic field is formed for a predetermined period of time by the dynamic magnetic members, with orientation unopposed to or co-aligned with the orientation of the static magnetic members or with orientation unopposed to or co-aligned with the orientation of the second dynamic magnetic members; whereby a rotational torque force is exerted onto driven magnetic members 36 and swinging members 30 are rotated into the activated conformation, shown in FIGS. 1A and 1B, flapping the wings of the ornithopter (not shown) in downward direction. Thereafter the induction of dynamic magnetic members is halt and the magnetic field formed thereby is deactivated. Subsequently, from the activated conformation, shown in FIGS. 1A and 1B, a magnetic field is formed for a predetermined period of time by the dynamic magnetic members, with orientation opposed to the orientation of the static magnetic members or with orientation opposed to the orientation of the second dynamic magnetic members; whereby a rotational torque force is exerted onto driven magnetic members 36 and swinging members 30 are forcefully driven into the deactivated conformation, shown in FIGS. 2A and 2B, thus competing the flapping cycle by flapping the wings of the ornithopter (not shown) in upward direction.

Optionally, ornithopter engine 10 comprises controller module 50. Controller module 50 is used for selectively powering dynamic magnetic members. Controller module 50 is typically coupled to electrical power source.

Figure 3:
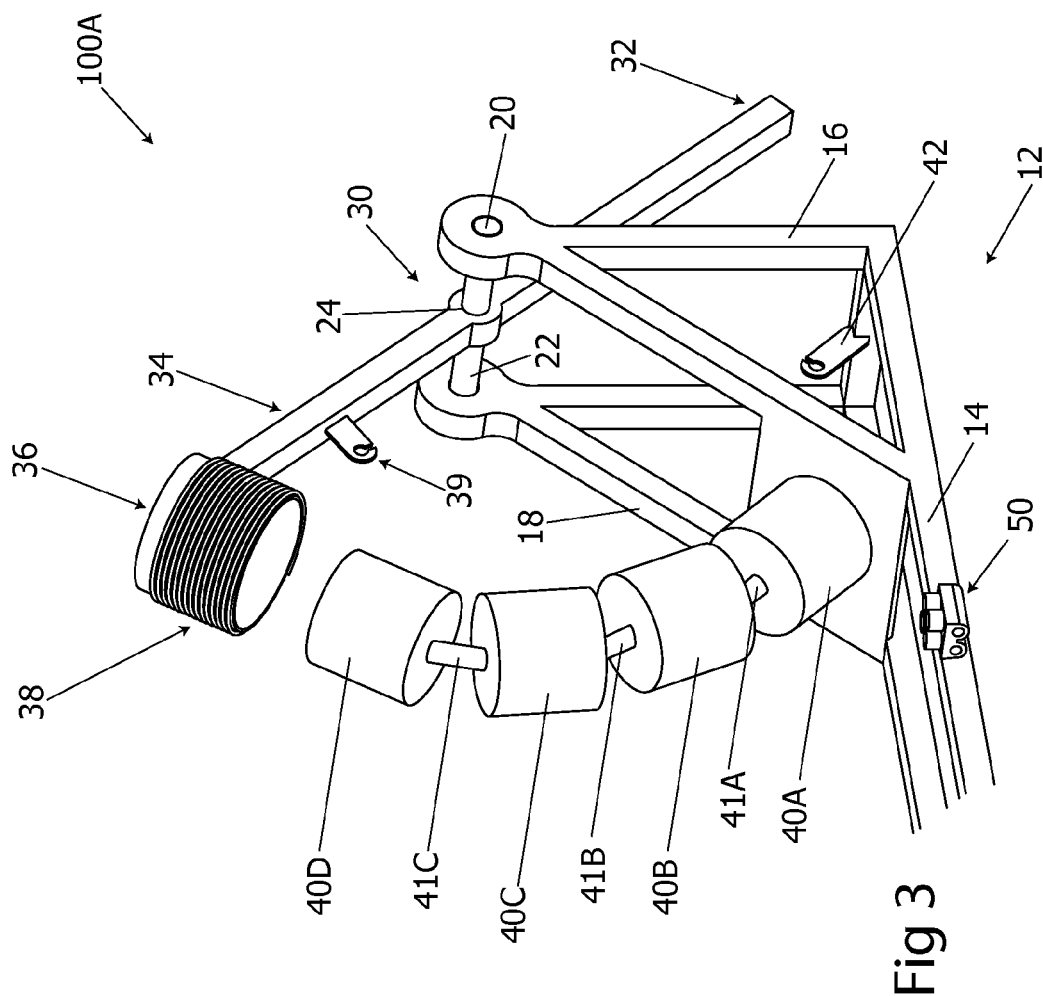
FIG. 3 is a schematic isometric view of a moiety of a preferred embodiment of the ornithopter engine of the invention, in an activated conformation.

In accordance with some preferred embodiments of the present invention, reference is now made to FIG. 3, showing moiety 100A of the ornithopter engine. Moiety 100A includes structural frame 12, swinging member 30 and a plurality of driving magnetic members 40A to 40D. Structural frame 12 further comprises base portion 14, swinging member mounting portion 16 and driving magnetic member mounting portion 18.

Swinging member mounting portion 16 extends upwardly from base portion 14 of structural frame 12. Swinging member mounting portion 16 is furnished with bearings 20. Bearings 20 are any type of suitable bearings known in the art, inter alia including ball bearings, cylindrical rollers bearings, tapered rollers bearings, spherical rollers bearings, needles bearings, plain or frictional bearings, fluid bearings, magnetic bearings and flexure bearings. Shaft 22 is mounted within bearings 20, providing for a smooth rotational movement of shaft 22 relatively to swinging member mounting portion 16 of structural frame 12. Swinging member 30 is affixed on shafts 22 and thereby rotatable on shaft 22 relatively to swinging member mounting portion 16 of structural frame 12.

Alternatively or additionally to bearings 20, at the top of swinging member mounting portion 16 of structural frame 12, swinging member 30 are furnished with bearing 24. Shaft 22 is affixed in bearing 24; thereby facilitating a smooth rotational movement of swinging members 30 relatively to shafts 22.

Driving magnetic member mounting portion 18 extends from base portion 14 of structural frame 12 at a predetermined angle. Driving magnetic member mounting portion 18 support driving magnetic members 40A to 40D. The angle at which driving magnetic member mounting portion 18 extends from base portion 14 of structural frame 12 positions driving magnetic members 40A to 40D to coincide with a sector of the toroidal trajectory of the swinging member 30, while rotated about shaft 22.

Spacers 41A to 41C are preferably employed to position driving magnetic members 40A to 40D coinciding with a sector of the toroidal trajectory formed by the driven magnetic member 36 on swinging member 30, while the latter is rotated about shaft 22.

Swinging members 30 comprise wing associated portion 32. Wing associated portion 32 of swinging member 30 optionally embodies at least one structural element (not shown) for affixing/mounting a wing assembly (not shown) thereto/thereon. Alternatively or additionally wing associated portion 32 of swinging members 30 embodies an integral part of the wing assembly (not shown). Optionally wing associated portion 32 of swinging member 30 further comprise joints or pivotally connected extensions, forming a wave-like flapping motion of the of the peripheral portion/s of the wing assembly (not shown).

Swinging member 30 comprises magnetic members associated portion 32. Magnetic members associated portion 32 terminates with driven magnetic members 36. Driven magnetic member 36 forms a toroidal trajectory while swinging member 30 is rotated about shaft 22. A sector of the toroidal trajectory formed by driven magnetic member 36 upon rotation of swinging member 30 about shaft 22 coincides with driving magnetic members 40A to 40D.

Optionally, structural frame 12 of ornithopter engine 10 includes tab 42 and swinging members 30 includes respective tab 39. A biasing means (not shown) is drawn between tab 42 of structural frame 12 and respective tab 39 of swinging members 30. The biasing means is a spring, stretchable band or any other elastic element capable of contracting upon being stretched; thereby driving swinging members 30 of moiety 100A of the ornithopter engine shown in FIG. 3, into the deactivated conformation (not shown). A compressible biasing means that accumulates energy by construction upon rotation of swinging member 30 is equally applicable.

Driving magnetic members 40A to 40D are typically dynamic magnetic members, which are activated independently of each other; whereas driven magnetic members 36 is typically either static or dynamic magnetic member.

Moiety 100A of the ornithopter engine is optionally operable in unidirectional and/or bidirectional action modi operandi, as specified supra. Alternatively or additionally moiety 100A of the ornithopter engine is operable in a plural unidirectional action modus operandi and/or plural bidirectional modus operandi.

In the plural unidirectional action modus operandi, from the deactivated conformation (not shown) where driving magnetic member 40A and driven magnetic member 36 are disposed the former within the latter, a magnetic field is formed for a predetermined period of time by the dynamic driving magnetic member 40A, with orientation unopposed to or co-aligned with the orientation of the driven magnetic member 36; whereby a rotational torque force is exerted onto driven magnetic member 36 and swinging member 30 is rotated in a clockwise direction. Thereafter upon a predetermined angular translation of swinging member 30 the induction of dynamic driving magnetic member 40A is halt and the magnetic field formed thereby is deactivated. Then a magnetic field is formed for a predetermined period of time by the dynamic driving magnetic member 40B, with orientation unopposed to or co-aligned with the orientation of the driven magnetic member 36; whereby a further rotational torque force is exerted onto driven magnetic member 36 and swinging member 30 is further rotated in a clockwise direction.

Thereafter upon a predetermined angular translation of swinging members 30 the induction of dynamic driving magnetic member 40B is halt and the magnetic field formed thereby is deactivated. Then a magnetic field is formed for a predetermined period of time by the dynamic driving magnetic member 40C, with orientation unopposed to or co-aligned with the orientation of the driven magnetic member 36; whereby a yet further rotational torque force is exerted onto driven magnetic member 36 and swinging member 30 is yet further rotated in a clockwise direction.

Ultimately, upon a predetermined angular translation of swinging members 30 the induction of dynamic driving magnetic member 40C is halt and the magnetic field formed thereby is deactivated. Then a magnetic field is formed for a predetermined period of time by the dynamic driving magnetic member 40D, with orientation unopposed to or co-aligned with the orientation of the driven magnetic member 36; whereby a yet still further rotational torque force is exerted onto driven magnetic member 36 and swinging member 30 is yet still further rotated in a clockwise direction.

The consequent activation of the dynamic driving magnetic member 40A to 40D facilitates intermittent exertion of rotational torque onto driven magnetic member 36; thereby intermittently and forcefully driving swinging member 30 in a clockwise direction.

In the plural bidirectional action modus operandi, additionally to the steps of single or plural unidirectional action modi operandi, as elaborated hereinabove, from the activated conformation, shown in FIG. 3, a magnetic field is consequently formed for a predetermined periods of time by driving magnetic members 40A to 40D, with orientation opposed to the orientation of the magnetic field formed by driven magnetic member 36; whereby an intermittent rotational torque force is exerted onto driven magnetic member 36 and swinging member 30 is forcefully and intermittently rotated in a counter-clockwise direction.

It should be acknowledged that ornithopter engine moiety 100A is optionally operable in any combination of unidirectional and/or bidirectional action modi operandi as well as single and/or plural action modi operandi. Thus ornithopter engine moiety 100A is optionally operable in a plural-unidirectional and/or single-bidirectional modus operandi.

BEST MODE FOR PRACTICING AND CARRYING OUT THE INVENTION

Figure 4C:
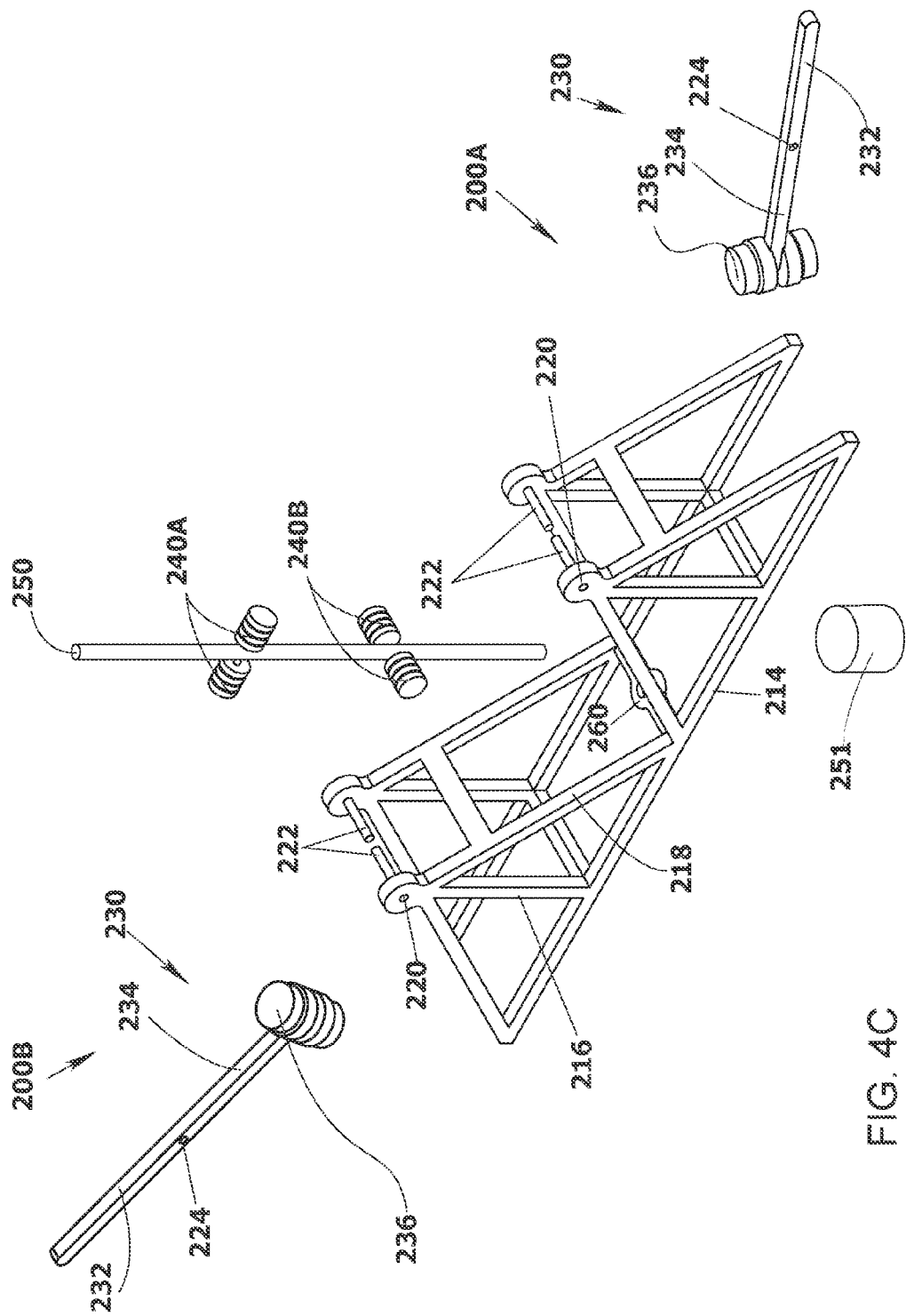
FIG. 4C is an exploded isometric view of a preferred embodiment of the ornithopter engine of the invention, in a deactivated conformation.

In accordance with some preferred embodiments of the present invention, isometric, side and exploded views of ornithopter engine 200 is shown in FIG. 4A to 4C, respectively, in a deactivated conformation. Ornithopter engine 200 comprises moieties 200A and 200B. Moieties 200 of ornithopter engine 200 are typically operable in unison with each other, respectively dedicated for operating each the two wings of the ornithopter (not shown). Moieties 200A and 200B include a structural frame, swinging members 230 and driving magnetic members 240, mounted on shaft 250. The structural frame further comprises base portion 214, swinging member mounting portions 216 and 218 as well as driving magnetic member shaft 250 mounting portion 260.

Swinging member mounting portions 216 extend upwardly from base portion 214 of structural the frame. Swinging member mounting portions 216 are furnished with bearings 220. Bearings 220 are any type of suitable bearings known in the art, inter alia including ball bearings, cylindrical rollers bearings, tapered rollers bearings, spherical rollers bearings, needles bearings, plain or frictional bearings, fluid bearings, magnetic bearings and flexure bearings. Shafts 222 are mounted within bearings 220, providing for a smooth rotational movement of shafts 222 relatively to swinging member mounting portions 216 of the structural frame. Swinging members 230 are affixed on shafts 222 and thereby rotatable on shafts 222 relatively to swinging member mounting portions 216 of the structural frame.

Alternatively or additionally to bearings 220, at the top of swinging member mounting portions 216 of the structural frame, swinging members 30 are furnished with bearings 224. Shafts 222 are affixed in bearings 224; thereby facilitating a smooth rotational movement of swinging members 230 relatively to shafts 222.

Driving magnetic members 240A and 240B mounting shaft 250 extends from shaft mounting portion 260 at base portion 214 of the structural frame, typically essentially perpendicularly thereto. Driving magnetic member mounting portion 260 bears to pairs of driving magnetic members 240A and 240B. The angle at which driving magnetic member 240A and 240B are disposed relatively to swinging members 230, is determined by the angular position of mounting shaft 250 which is rotatable relatively to shaft mounting portion 260 at base portion 214 of the structural frame.

Swinging members 230 comprise wing associated portions 232. Wing associated portions 232 of swinging members 230 optionally embody at least one structural element (not shown) for affixing/mounting a wing assembly (not shown) thereto/thereon. Alternatively or additionally wing associated portions 232 of swinging members 230 embody an integral part of the wing assembly (not shown). Optionally wing associated portions 232 of swinging members 230 further comprise joints or pivotally connected extensions, forming a wave-like flapping motion of the of the peripheral portion/s of the wing assembly (not shown).

Swinging members 230 comprise magnetic members associated portions 234. Magnetic members associated portions 234 terminate with driven magnetic members 236. Driven magnetic members 236 form a toroidal trajectory while swinging members 230 are rotated about shaft 222. The toroidal trajectory formed by driven magnetic members 236 upon rotation of swinging members 230 about shaft 222 does not intersect with driving magnetic members 240 while rotated on shaft 250.

Driven magnetic member 236 and/or driving magnetic member 240 are typically metallic magnets, nevertheless driven magnetic member 236 and/or driving magnetic member 240 are optionally at least one of: a ferromagnetic element, solenoid or any type of wound coil and nonmetallic magnet made from an organic polymer, such as PANiCNQ, which is a combination of emeraldine-based polyaniline (PANi) and tetracyanoquinodimethane (TCNQ).

The magnetic members typically embody a pair of cylinders and/or assembly of discs, such as driving magnetic members 240 and driven magnetic members 236, wherein the tolerances in-between the trajectories thereof facilitates a translation of the former relatively the latter, without collision.

It should be acknowledged that in FIG. 4A to 4C driving magnetic members 240 driven magnetic members 236 are shown as embodying a shape of a assembly of metallic magnet discs, merely by a way of example, whereas in other examples driving magnetic members 240 embodying a cylindrical shape and driven magnetic members 236 embodying a cylindrical shape as well. Driven magnetic members 236, which are characterized by a substantial weight, are implementable for counterbalancing the weight of the wing assembly (not shown) mounted on wing associated portions 232 of swinging members 230.

Driven magnetic member 236 and/or driving magnetic member 240 as well as any magnetic member referred to herein for that matter are typically either static magnetic members or dynamic magnetic members. Static magnetic members, as referred to herein, comprise an element that constantly forms and/or generates a magnetic field about itself or is constantly sensitive to a magnetic field about itself, which typically include the examples of metallic/nonmetallic magnet and respectively ferromagnetic element that embody a cylindrical shape.

Dynamic magnetic members, as referred to herein, comprise an element that non-constantly or intermittently and controllably forms and/or generates a magnetic field about itself or is non-constantly or intermittently and controllably sensitive to a magnetic field about itself, which typically include the examples of a solenoid or wound coil that optionally embody a cylindrical shell shape.

Figure 5:
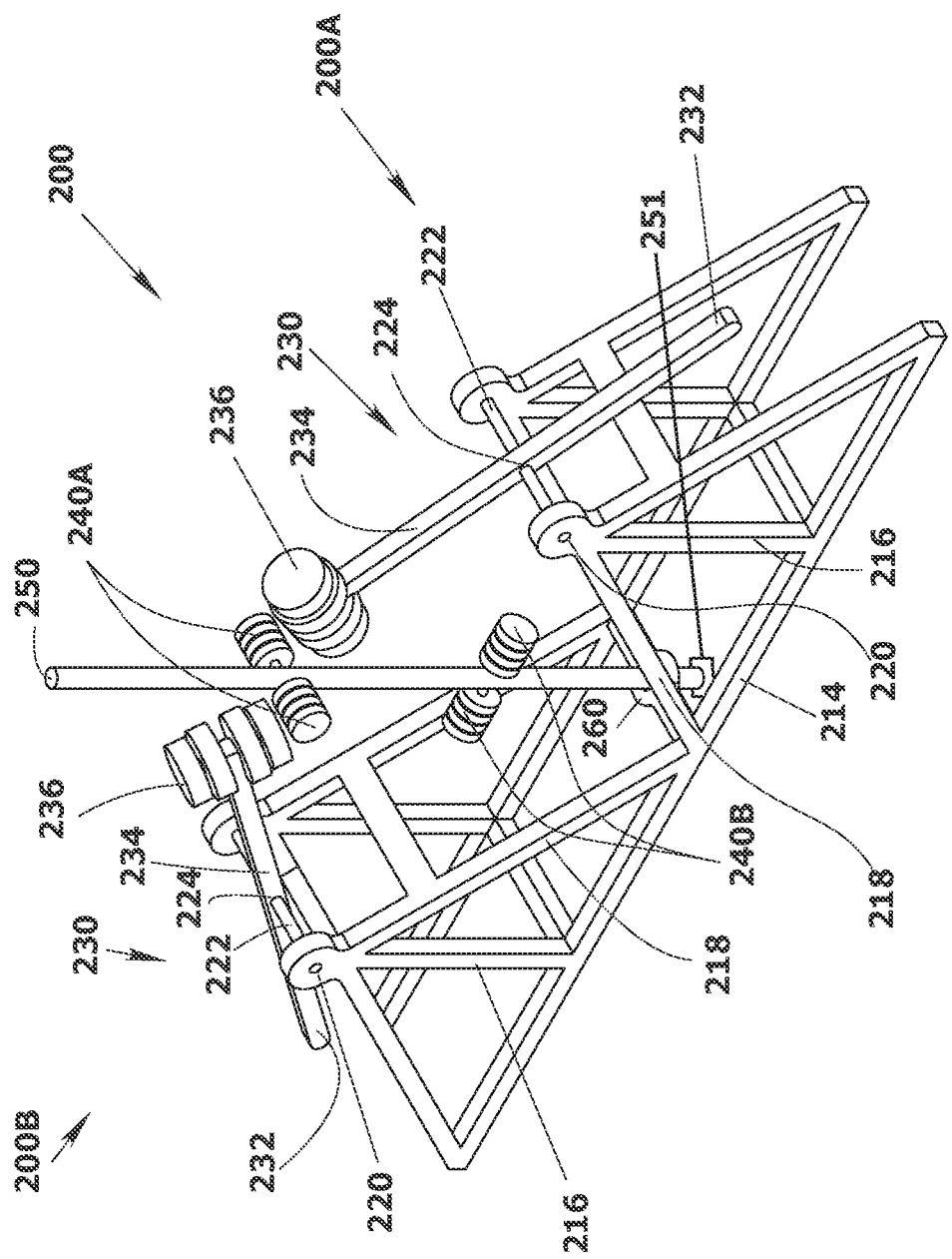
FIG. 5 is an isometric view of a preferred embodiment of the ornithopter engine of the invention, in an activated conformation.
Figure 6A:
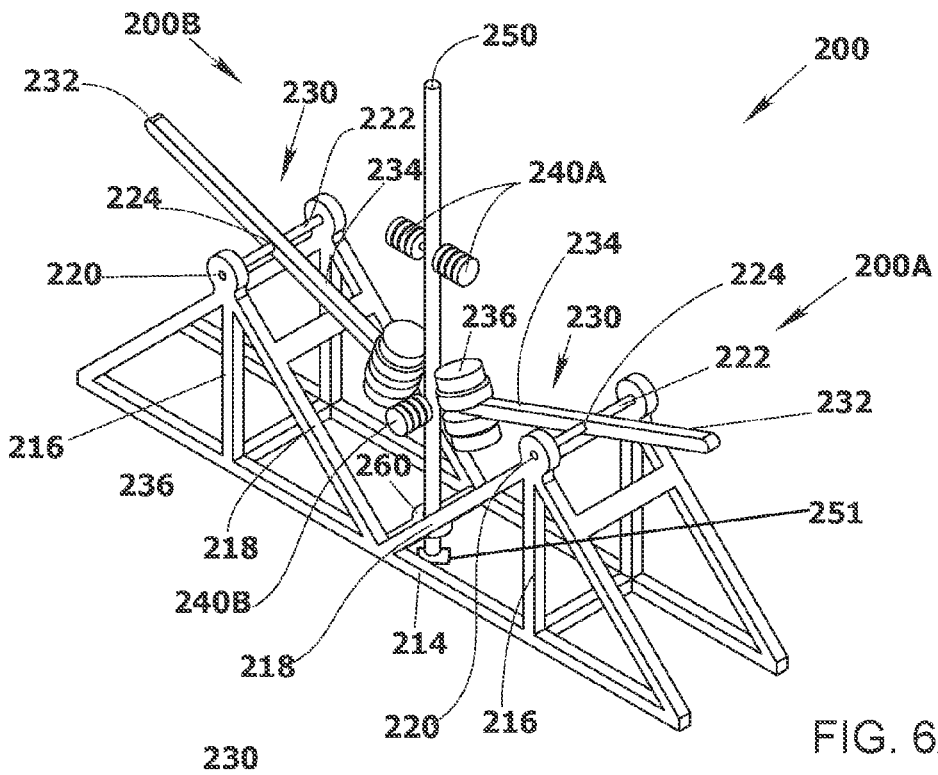
FIG. 6A is an isometric view of a preferred embodiment of the ornithopter engine of the invention, in a deactivated conformation, presented right next to a preferred embodiment of the ornithopter engine of the invention, in an activated conformation, shown in FIG. 6B.
Figure 6B:
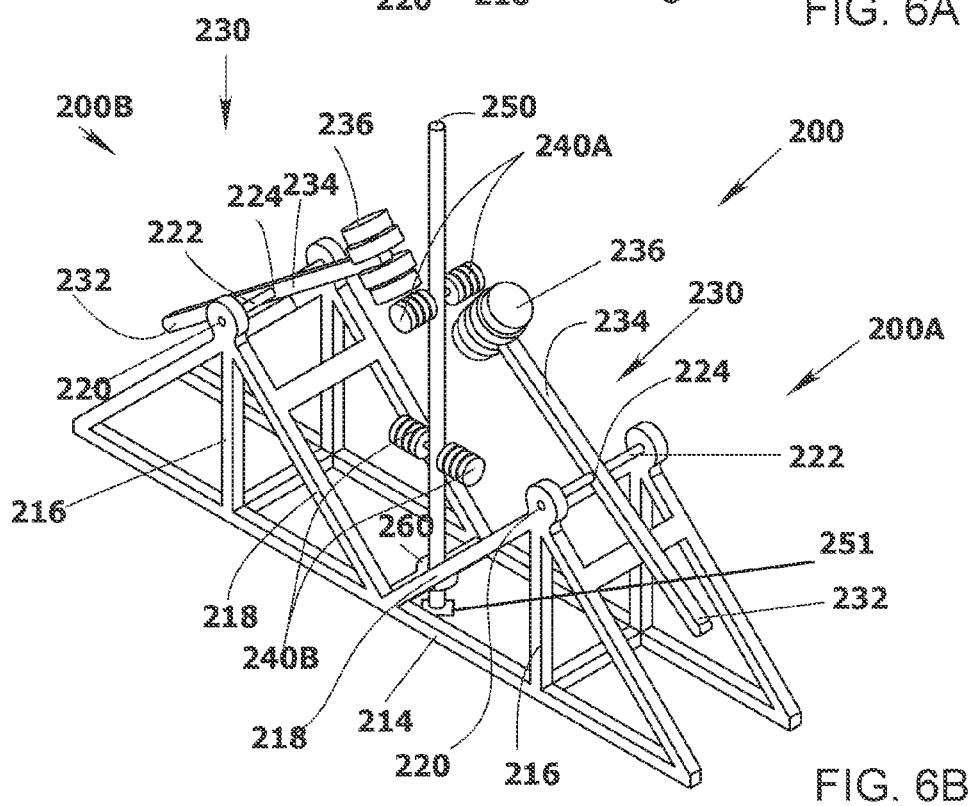
FIG. 6B is an isometric view of a preferred embodiment of the ornithopter engine of the invention, in an activated conformation, presented right next to a preferred embodiment of the ornithopter engine of the invention, in a deactivated conformation, shown in FIG. 6A.

Each moiety 200A or 200B of ornithopter engine 200 optionally comprises at least one static magnetic member and/or least one dynamic magnetic member or only static magnetic members. Each moiety 200A or 200B of ornithopter engine 200 is typically operable in a bidirectional action modus operandi. In the bidirectional action modus operandi, from the deactivated conformation, shown in FIG. 4A to 4C, where the first pair of driving magnetic members 240A is disposed essentially paralleling to driven magnetic members 236, whereas the second pair of driving magnetic members 240B is disposed essentially orthogonally to driven magnetic members 236, engine 200 is driven to the activated conformation, shown in FIGS. 5 and 6B, where the first pair of driving magnetic members 240A is disposed essentially orthogonally to driven magnetic members 236, whereas the second pair of driving magnetic members 240B is disposed essentially paralleling to driven magnetic members 236, whereby a first rotational torque force is exerted onto driven magnetic members 236 and swinging members 230 are forcefully driven into the activated conformation, shown in FIGS. 5 and 6B, competing the first half of the flapping cycle by flapping the wings of the ornithopter (not shown) in downward direction, and a second rotational torque force is exerted onto driven magnetic members 236 and swinging members 230 are forcefully driven into the deactivated conformation, shown in FIGS. 4A to 4C and 6A, thus competing an entire flapping cycle by flapping the wings of the ornithopter (not shown) in upward direction.

Shaft 250 is coupled to a driving motor 251, typically via a planetary gear (not shown). Upon rotation of shaft 250 about 90 degrees, swinging members 230 perform a first half of the flapping cycle, whereas during rotation of shaft 250 about subsequent 90 degrees, swinging members 230 complete an entire flapping cycle. Throughout the subsequent rotation of shaft 250 about next 180 degrees, swinging members 230 complete an additional entire flapping cycle; thereby upon rotation of shaft 250 about 360 degrees, swinging members 230 complete two entire flapping cycles. It is noted that the convention of rotational energy into kinetic energy of the flapping motion is performed virtually frictionlessly, as except of friction in bearings 220 and the bearings in portion 260 of base portion 214 of the structural frame and the friction with air, the mechanical energy is converted essentially frictionlessly, as there is no physical contact between the driving parts and the driven parts.

Optionally, ornithopter engine 200 comprises a controller module (not shown). The controller module is used for selectively powering dynamic magnetic members and/or controlling the rotation of shaft 250.

As previously defined, the term ornithopter and/or ornithopter engine, as referred to herein, should be understood as an appliance adapted to produce an iterative flapping motion. The term ornithopter and/or ornithopter engine, as referred to herein, should not be construed as entailing an implementation in aviation field or aeronautic arts but rather as an as appliance adapted to produce an iterative flapping motion. Consequently, the term wing portion or alike do not necessarily entails connection with a wing but rather operational connection to any other mechanical constituent for that matter.

Various implementations of the ornithopter engine of the present invention share the functional output of iterative flapping motion produced by such ornithopter or ornithopter engine—without signifying the implementation of such ornithopter or ornithopter engine in particular field of the art. Among various implementations of the ornithopter engine of the present invention, implementation as fan and blower is noted.

It will be appreciated by persons skilled in the art that the present invention is not limited by what has been particularly shown and described herein above.

Rather the scope of the invention is defined by the claims which follow:

1. An ornithopter engine comprising two moieties, said engine comprises:
   (a) a structural frame, wherein said structural frame further comprises:
      (1) at least two swinging member mounting portions, wherein each one of said at least two swinging member mounting portions, is disposed at a different moiety of said two moieties of said engine;
      (2) a driving magnetic members shaft mounting portion;
   (b) driving magnetic members shaft, said driving magnetic members shaft is mounted in said driving magnetic members shaft mounting portion of said structural frame, wherein said driving magnetic members shaft is rotatable relatively to said driving magnetic members shaft mounting portion of said structural frame;
   (c) at least two driving magnetic members, said driving magnetic members are affixed to said driving magnetic member shaft;
   (d) at least two swinging members, wherein each one of said at least two swinging members is pivotally mounted onto said swinging member mounting portions of said structural frame, at each one of said moieties of said engine;

(e) wherein the at least two swinging members are rotatable relatively to the swinging member mounting portions of said structural frame; wherein each said swinging member comprises at least:
  (1) a wing associated portion for mounting a wing assembly thereon, and
  (2) a magnetic member associated portion;
(f) at least one driven magnetic member, said driven magnetic member is affixed to said magnetic member associated portion of said swinging member;
(g) a motor, rotably coupled to said driving magnetic members shaft; said ornithopter engine is characterized by that:
(h) upon rotation of said driving magnetic members shaft, said swinging members perform iterative partial rotation, in opposite directions, in turn, relatively to said swinging member mounting portions of said structural frame; whereby a rotational energy of said driving magnetic members shaft is converted, essentially frictionlessly, into a mechanical energy of a flapping motion, performed by said swinging members.

2. The ornithopter engine as set forth in claim 1, wherein each of said at least one driving magnetic member and said at least one driven magnetic member is selected from the group consisting of: a metallic magnet, ferromagnetic element, solenoid, wound coil, nonmetallic magnet, magnet made from an organic polymer, a PANiCNQ combination of emeraldine-based polyaniline (PANi) and tetracyanoquinodimethane (TCNQ).

3. The ornithopter engine as set forth in claim 1, wherein at least one of said driving magnetic members and at least one of said driven magnetic members embodies a shape selected from the group consisting of: a cylinder, cylinder shell and disc.

4. The ornithopter engine as set forth in claim 1, wherein a magnetic member which embodies a cylindrical shape or a sector-of-torus shape is selected from the group consisting of: a metallic magnet, ferromagnetic element, a nonmetallic magnet and magnet made from an organic polymer.

5. The ornithopter engine as set forth in claim 1, wherein a magnetic member which embodies a cylindrical shell shape or sector-of-torus-shell shape is selected from the group consisting of: a solenoid and wound coil.

6. The ornithopter engine as set forth in claim 1, wherein said driven magnetic member is at least one selected from the group consisting of: a metallic magnet, ferromagnetic element and nonmetallic magnet, which is characterized by a substantially larger weight for counterbalancing the weight of said wing assembly.

7. The ornithopter engine as set forth in claim 1, wherein said at least one driving magnetic member and said at least one driven magnetic member embodies a shape selected from the group consisting of: a static magnetic member and dynamic magnetic member; wherein said static magnetic member constantly forms/generates a magnetic field and/or is constantly sensitive to a magnetic; whereas said dynamic magnetic member non-constantly or intermittently and controllably forms/generates a magnetic field or is non-constantly or intermittently and controllably sensitive to a magnetic field.

8. The ornithopter engine as set forth in claim 1, wherein each moiety thereof comprises at least one static magnetic member and at least one dynamic magnetic member.

9. The ornithopter engine as set forth in claim 1, wherein each moiety thereof comprises at least two static magnetic members.

10. The ornithopter engine as set forth in claim 1, wherein each moiety thereof comprises a plurality of driving magnetic members.

11. The ornithopter engine as set forth in claim 1, wherein said wing associated portion of said swinging member comprising at least one structural element for affixing/mounting a wing assembly thereto/thereon.

12. The ornithopter engine as set forth in claim 1, wherein said wing associated portion of said swinging member embodies an integral part of a wing assembly.

13. The ornithopter engine as set forth in claim 1, comprises a plurality of driving magnetic members, which are dynamic magnetic members activated independently of each other.

14. The ornithopter engine as set forth in claim 1, wherein said swinging member mounting portion is furnished with bearings.

15. The ornithopter engine as set forth in claim 1, wherein said shaft is mounted in said swinging member mounting portion of said structural frame.

16. The ornithopter engine as set forth in claim 15, wherein said bearings are selected from the group consisting of: ball bearings, cylindrical rollers bearings, tapered rollers bearings, spherical rollers bearings, needles bearings, plain or frictional bearings, fluid bearings, magnetic bearings and flexure bearings.

17. A method of generating an iterative flapping motion of an ornithopter engine comprises: a structural frame, comprising at least two swinging member mounting portions, wherein each one of said at least two swinging member mounting portions, is disposed at a different moiety of said two moieties of said engine; a driving magnetic members shaft mounting portion; driving magnetic members shaft, said driving magnetic members shaft is mounted in said driving magnetic members shaft mounting portion of said structural frame, wherein said driving magnetic members shaft is rotatable relatively to said driving magnetic members shaft mounting portion of said structural frame; at least two driving magnetic members, said driving magnetic members are affixed to said driving magnetic member shaft; at least two swinging members, wherein each one of said at least two swinging members is pivotally mounted onto said swinging member mounting portions of said structural frame, at each one of said moieties of said engine, wherein the at least two swinging members are rotatable relatively to the swinging member mounting portions of said structural frame, wherein each said swinging member comprises at least: a wing associated portion for mounting a wing assembly thereon, a magnetic member associated portion and at least one driven magnetic member, said driven magnetic member is affixed to said magnetic member associated portion of said swinging member; a motor, rotably coupled to said driving magnetic members shaft; said method comprises the steps of:
  (a) positioning said driving magnetic members essentially orthogonally to said driven magnetic members, thereby driving said swinging members into a deactivated conformation;
  (b) rotating said shaft, about 90 degrees, thereby positioning said driving members essentially paralleling to said driven magnetic members, and thereby driving said swinging members into an activated conformation;
  (c) further rotating said shaft, about next 90 degrees, thereby positioning said driving magnetic members essentially orthogonally to said driven magnetic members, and thereby driving said swinging members into said deactivated conformation;

(d) repeating aforesaid steps of rotating and further rotating; thereby operating said ornithopter engine.

18. The method of generating an iterative flapping motion of an ornithopter engine as set forth in claim 17, further comprising the steps of:
   (a) for a predetermined period of time electrically powering dynamic magnetic members, forming a magnetic field the orientation of which is opposed to the orientation of the driven magnetic members; whereby a rotational torque force is exerted onto said driven magnetic members;
   (b) thereafter stopping to electrically power said dynamic magnetic members and deactivating said magnetic field the orientation of which is opposed to the orientation of said driven magnetic members; thereby operating said ornithopter engine.

19. The method of generating an iterative flapping motion of an ornithopter engine as set forth in claim 18, further comprising the steps of:
   (a) for a predetermined angle of rotation of said driving magnetic members shaft forming a magnetic field by said dynamic driving magnetic members, with orientation essentially paralleling with the orientation of said driven magnetic members; thereby exerting a rotational torque onto said driven magnetic members;
   (b) for a predetermined angle of rotation of said driving magnetic members shaft forming a magnetic field by said dynamic driving magnetic members, with orientation essentially orthogonal to the orientation of said driven magnetic members; thereby exerting a rotational torque onto said driven magnetic members, in an opposite direction.

20. The method of generating an iterative flapping motion of an ornithopter engine as set forth in claim 17, wherein said ornithopter engine comprises a plurality of dynamic magnetic members, which are affixed essentially orthogonally to each other, on said driving magnetic members shaft.

* * * * *